Jan. 20, 1925.  1,523,725

H. SCHWEITER

SWIFT MACHINE

Filed Feb. 13, 1924

Inventor
Hans Schweiter
Per Ferdinand Broker Bonhard
Attorney.

Patented Jan. 20, 1925.

1,523,725

UNITED STATES PATENT OFFICE.

HANS SCHWEITER, OF HORGEN, SWITZERLAND.

SWIFT MACHINE.

Application filed February 13, 1924. Serial No. 692,579.

*To all whom it may concern:*

Be it known that I, HANS SCHWEITER, a Swiss citizen, residing at Horgen, in the Canton of Zurich, Switzerland, have invented a new and useful Improvement in Swift Machines, of which the following is a specification.

This invention relates to swift machines wherein the swift adapted to carry one or more hanks is positively driven and carried by an arm at one side.

The object of my invention is to obviate the necessity for a special or separate operation in order to reduce the circumference of the swift.

I attain this object by the means illustrated in the accompanying sheet of drawings, wherein—

Figure 1:
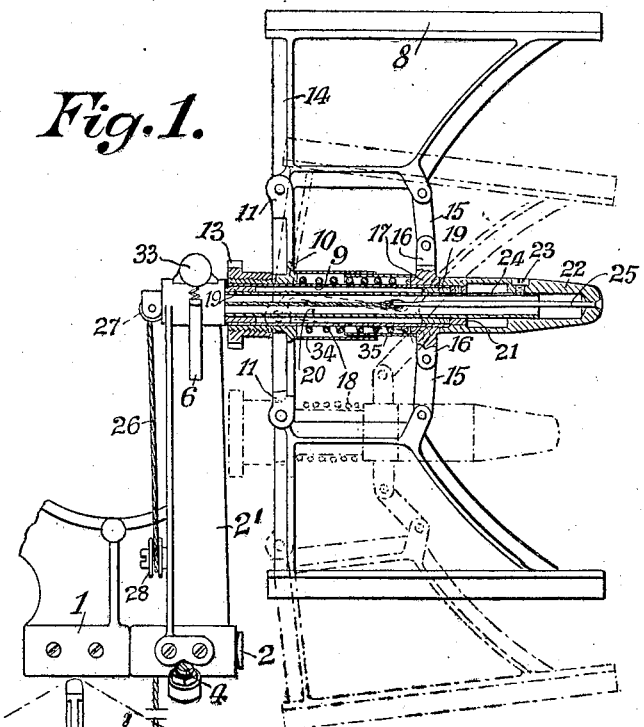
Figure 1 is an elevation partly in section.

Referring to the drawings, a stud 2 is fixed to the frame 1 of the machine and has the swift arm 2′ oscillatably mounted on it, a projection 3 and a binding and stop screw 4 being provided to limit the outward and downward movement of the arm 2′ by impingement on the carrying rod 5. A locking lever 6 provided on the arm 2′ and under spring pressure retains the arm 2′ together with the swift 8 in its higher position by engagement with a nose 7 on the frame 1.

The swift 8 has a hub 10 fixed on a sleeve 9 and provided with radial arms 11, a wheel 13 being fixed on the hub 10 and being adapted to be driven by a wheel 12. The wheel 12 is driven by a co-axial strap roller (not shown). A frame-like hank support 14 is hinged to each arm 11 and each of these supports is jointed by a link 15 to an arm 16 provided on a hub collar 17 slidable on the sleeve 9. A spring 18 arranged between the hub 10 and the sliding collar 7 on the sleeve 9 strives to force the collar 17 away from the hub 10 towards the right hand and to thereby bring the oscillatable supports 14 into their operative positions (shown in full lines, Figure 1) in which the swift has the largest diameter.

A ring 19 is fixed to each end of the collar 9 at the inner side thereof and is rotatably mounted on an internal sleeve 20 clamped in the carrying arm 2′. A set ring 21 fixed on the sleeve 20 prevents displacement of the sleeve 9 towards the right hand. Displacement of the sleeve 9 towards the left hand is prevented by the arm 2′ against which the sleeve 9 abuts. A sliding member 22 is slidably mounted on the free end of the sleeve 20, the movement in both directions of the sliding sleeve being limited by a screw 23 which engages with its point in a slit 24 of the sleeve 20. The inner end of the sliding sleeve 22 abuts against the slidable collar 17 of the swift, whilst the outer end of the sleeve 22 carries an axial rod 25. One end of a pliable draw member 26 is attached to the inner end of the rod 25 and is guided through the free end of the arm 2′ over two guide rollers 27 and 28 mounted on the arm 2′, over a guide pulley 29 mounted on the frame and through a hole 30 in the frame. The draw member 26 carries an adjustable stop ring 31 and a weight 32. In order to prevent the spring 18 from becoming dusty, 2 telescoping sleeves 34 and 35 are provided.

The hereinbefore described means operate as follows:—

During winding the hereinbefore described parts are in the positions shown in full lines in both figures and the swift is rotated. The links 15 together with the arms 16 of the sliding hub 17 form toggle levers which are slightly forced outwards beyond the dead point, whereby an undesired giving way of the toggle levers is prevented. When the winding of the hank is complete, the swift drive is stopped, the locking lever 6 is disengaged from the nose 7 by pressure on the handle 33 provided on the arm 2′, and the arm 2′ is turned downwardly into the position illustrated by broken lines in Figure 2. This movement results in the tension member 26 being moved with the arm 2′ until the stop ring 31 abuts against the frame 1 and is arrested. The tension member 26 is now in a locked condition and a further downward turning movement of the arm 2′ effects a longitudinal displacement of the sliding hub 17 and sleeve 22 towards the left hand, whereby the hank supports 14 are drawn inwards and the diameter of the swift is thereby reduced, see the position illustrated in broken lines in Figure 1. Simultaneously the spring 18 is stressed. The hank can now be removed with ease.

After removal of the hank, the arm 2' is again swung upwards and the spring 18 returns the sliding hub 17 and sleeve 22 and also the supports 14 to their initial positions whereupon winding can be again commenced. The weight 32 draws the tension member 26 back as far as it will go.

It will be understood that with the above described means no special or separate hand movement is necessary to reduce the circumference of the swift.

The hank supports instead of being oscillatable may be arranged movable radially whilst remaining parallel with each other.

Figure 2:
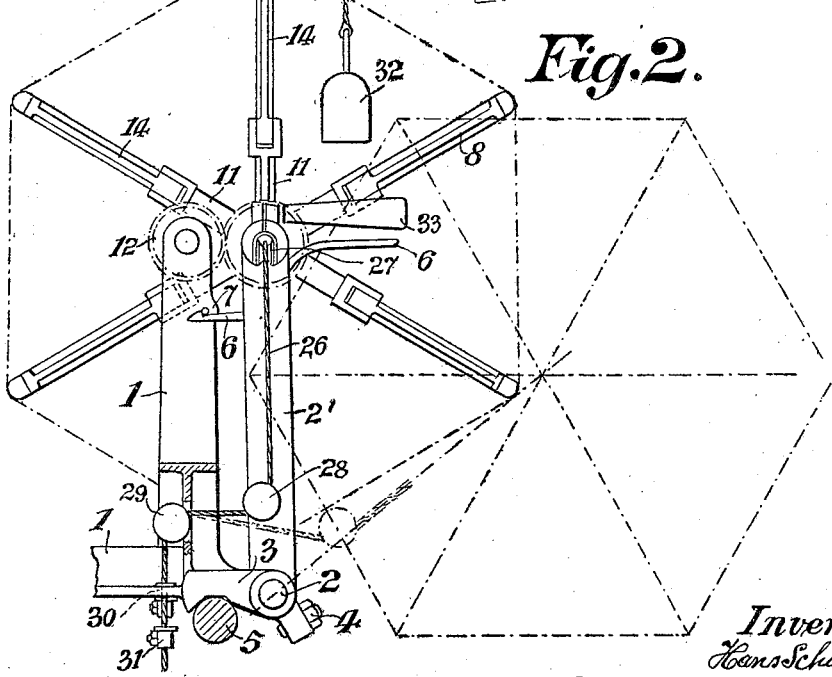
Figure 2 is a side view illustrating a constructional example of my invention.

The stud 2, Figure 1 can be lengthened towards the left and a second carrying arm of a second collapsible swift be mounted on the lengthened part. The two arms mounted on the same stud 2 can be secured together and will then swing to and fro together. From the foregoing it will be appreciated that my invention lies in combining with an oscillatable carrying arm, means which automatically reduce the swift circumference when the arm is swung outwards.

I claim:—

1. In a swift machine, a positively driven hank swift; an oscillatable arm carrying the swift; means operable by movement of the said arm in one direction to reduce the circumference of the swift; and spring means acting on the swift to automatically restore the full circumference of the swift on operation of the said arm in the other direction.

2. In a swift machine, a rotatable swift; an oscillatable arm carrying the swift; a swift hub; arms on the hub; supports hinged to the said arms; a sliding hub on the swift; arms on the sliding hub; links connecting the last named arms to the said supports and forming with the said arms toggle levers; spring means acting on the sliding hub to force the toggle levers over their dead centres on movement of the first named arm into its normal position.

3. In a swift machine, a collapsible swift; an oscillatable arm carrying the swift for bringing the said swift into and out of operative position; an axially sliding member on the swift operating to collapse and expand the swift; spring means on the swift for sliding the said member in one direction; a pliable draw member operatively connected to the sliding member to slide it in the other direction; and stop means on the pliable member for arresting the pliable member and causing it to collapse the swift on the outward swing of the arm carrying the swift.

Signed at Zurich, in the Canton of Zurich, Switzerland, this 24th day of January, 1924.

HANS SCHWEITER.

Witnesses:
A. F. CALCOEN,
JAMES R. WILKINSON.